US010200207B2

(12) United States Patent
Kim et al.

(10) Patent No.: US 10,200,207 B2
(45) Date of Patent: Feb. 5, 2019

(54) METHOD AND DEVICE FOR RECEIVING PHYSICAL MULTICAST CHANNEL IN WIRELESS ACCESS SYSTEM SUPPORTING 256QAM

(71) Applicant: LG ELECTRONICS INC., Seoul (KR)

(72) Inventors: Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,465

(22) PCT Filed: Jun. 30, 2015

(86) PCT No.: PCT/KR2015/006713
§ 371 (c)(1),
(2) Date: Jan. 6, 2017

(87) PCT Pub. No.: WO2016/006860
PCT Pub. Date: Jan. 14, 2016

(65) Prior Publication Data
US 2017/0207925 A1 Jul. 20, 2017

Related U.S. Application Data

(60) Provisional application No. 62/021,206, filed on Jul. 6, 2014.

(51) Int. Cl.
*H04L 12/18* (2006.01)
*H04L 27/34* (2006.01)
(Continued)

(52) U.S. Cl.
CPC ............ *H04L 12/189* (2013.01); *H04L 27/34* (2013.01); *H04W 72/005* (2013.01); *H04W 88/02* (2013.01)

(58) Field of Classification Search
CPC ..... H04L 12/189; H04L 27/34; H04W 72/005
See application file for complete search history.

(56) References Cited

U.S. PATENT DOCUMENTS 8,503,546 B1    8/2013  Ashrafi
9,722,848 B2 *  8/2017  Davydov .............. H04L 12/189
(Continued)

FOREIGN PATENT DOCUMENTS

CN   103493454    1/2014
JP   2012529781   11/2012
(Continued)

OTHER PUBLICATIONS

PCT International Application No. PCT/KR2015/006713, Written Opinion of the International Searching Authority dated Oct. 8, 2015, 27 pages.

(Continued)

*Primary Examiner* — Rhonda L Murphy
(74) *Attorney, Agent, or Firm* — Lee Hong Degerman Kang Waimey

(57) ABSTRACT

The present invention relates to a wireless access system supporting 256-ary Quadrature Amplitude Modulation (256QAM), and more particularly, to methods and apparatuses for transmitting and receiving a Physical Multicast Channel (PMCH) to provide Multimedia Broadcast and Multicast Service (MBMS). According to an embodiment of the present invention, a method for receiving a Physical Multicast Channel (PMCH) by a User Equipment (UE) in a wireless access system supporting 256QAM includes receiving a System Information Block (SIB) including information for acquiring a Multicast Control Channel (MCCH), receiving a PMCH carrying an MCCH including Multimedia Broadcast and Multicast Service (MBMS) control information, and receiving a PMCH carrying a Multicast Traffic Channel (MTCH) including MBMS data based on the
(Continued)

MBMS control information. 256QAM is not applied to the PMCH carrying the MCCH, and the UE determines a Modulation and Coding Scheme (MCS) and a Transport Block Size (TBS) using a second table supporting 256QAM to receive and demodulate the PMCH carrying the MTCH.

12 Claims, 16 Drawing Sheets

(51) Int. Cl.
*H04W 72/00* (2009.01)
*H04W 88/02* (2009.01)

(56) References Cited

U.S. PATENT DOCUMENTS

| | | |
|---|---|---|
| 2010/0322133 A1 | 12/2010 | Kuo |
| 2013/0044670 A1 | 2/2013 | Jang et al. |
| 2015/0098440 A1* | 4/2015 | Yang ............ H04J 11/0056 370/330 |
| 2015/0334769 A1* | 11/2015 | Kim ............ H04W 76/046 370/329 |
| 2016/0285935 A1* | 9/2016 | Wu ............ H04L 65/4076 |

FOREIGN PATENT DOCUMENTS

| | | |
|---|---|---|
| KR | 1020120115947 | 10/2012 |
| TW | 201129152 | 8/2011 |
| WO | 2011159055 | 12/2011 |

OTHER PUBLICATIONS

Taiwan Intellectual Property Office Application Serial No. 104121501, Office Action dated May 19, 2016, 4 pages.
3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.2.0, Jun. 2014, 207 pages.
Ericsson, "256QAM for PMCH transmissions", R1-142380, 3GPP TSG RAN WG1 Meeting #77, May 2014, 4 pages.
Intel Corporation, "Discussion on configuration aspects for 256QAM", R1-141153, 3GPP TSG RAN WG1 Meeting #76bis, Apr. 2014, 4 pages.
European Patent Office Application Serial No. 15819197.3, Search Report dated Jan. 18, 2018, 16 pages.
Alcatel-Lucent, et al., "256QAM for PMCH", 3GPP TSG RAN WG1 Meeting #78, R1-143006, XP050815401, Aug. 2014, 6 pages.
Alcatel-Lucent, et al., "WF on 256QAM for PMCH", 3GPP TSG RAN WG1 Meeting #78, R1-143405, XP050788917, Aug. 2014, 2 pages.
Huawei, "Discussion on 256 QAM for PMCH", 3GPP TSG RAN WG3 Meeting #85bis, R3-142197, XP050870711, Oct. 2014, 2 pages.
Huawei, et al., "SCE demodulation requirements", 3GPP TSG RAN WG4 Meeting #72bis, R4-145758, XP050871240, Oct. 2014, 8 pages.
NEC, "Proposal on change to description on 256QAM applicability to PMCH", 3GPP TSG RAN WG1 Meeting #80, R1-150283, XP050948587, Feb. 2015, 2 pages.
LG Electronics, "MBMS Notification Based on SIB", 3GPP TSG RAN WG2 Meeting #37, R2-031650, XP050124005, Aug. 2003, 4 pages.
Intel, "Discussion on the remaining details of MCS / TBS table for 256QAM", 3GPP TSG RAN WG1 Meeting #77, R1-142578, May 2014, 6 pages.
3rd Generation Partnership Project (3GPP), "Technical Specification Group Radio Access Network; Evolved Universal Terrestrial Radio Access (E-UTRA); Radio Resource Control (RRC); Protocol specification (Release 12)," 3GPP TS 36.331 V12.2.0, Jun. 2014, 365 pages.

* cited by examiner

FIG. 12
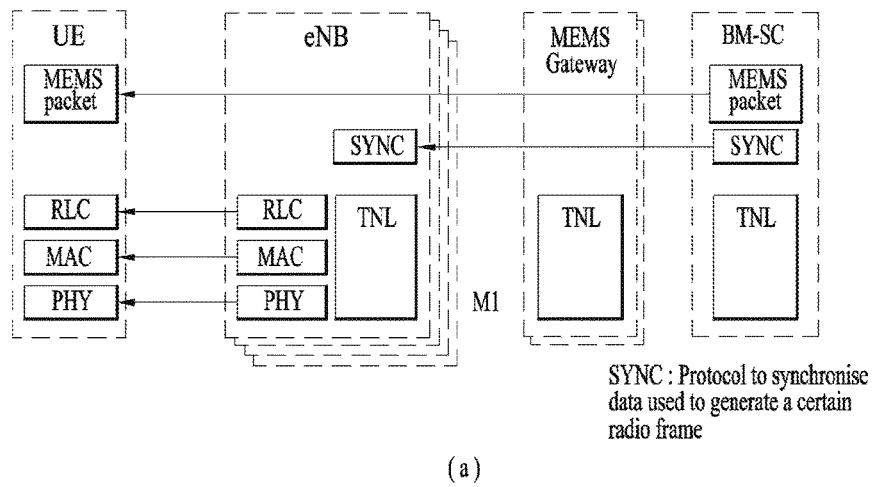
(a)
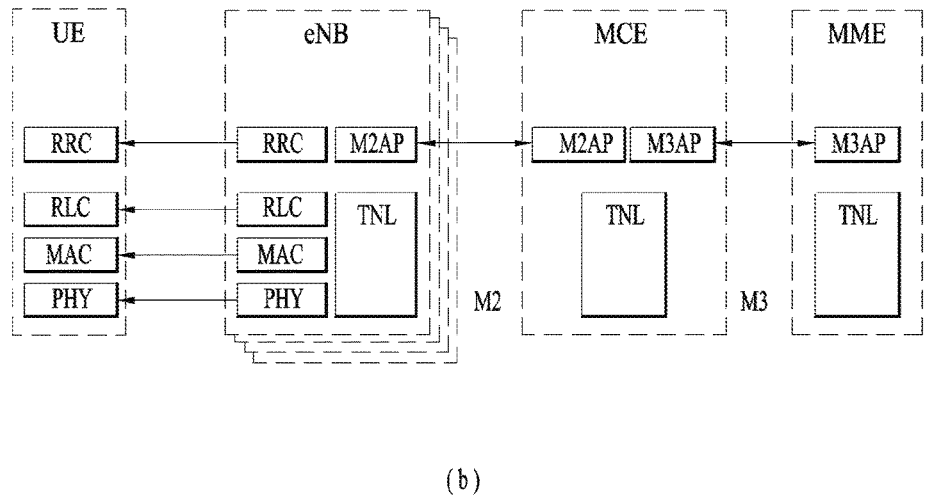
(b)

METHOD AND DEVICE FOR RECEIVING PHYSICAL MULTICAST CHANNEL IN WIRELESS ACCESS SYSTEM SUPPORTING 256QAM

CROSS-REFERENCE TO RELATED APPLICATIONS

This application is the National Stage filing under 35U.S.C. 371 of International Application No. PCT/KR2015/006713, filed on Jun. 30, 2015, which claims the benefit of U.S. Provisional Application No. 62/021,206, filed on Jul. 6, 2014, the contents of which are all hereby incorporated by reference herein in their entirety.

TECHNICAL FIELD

The present invention relates to a wireless access system supporting 256-ary Quadrature Amplitude Modulation (256QAM), and more particularly, to methods and apparatuses for transmitting and receiving a Physical Multicast Channel (PMCH) to provide Multimedia Broadcast and Multicast Service (MBMS).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

A current Longer Term Evolution (LTE)/Longer Term Evolution-Advanced (LTE-A) system adopts only Quadrature Phase Shift Keying (QPSK), 16-ary Quadrature Amplitude Modulation (16QAM), and 64QAM as modulation schemes. However, whether to use 256QAM having a higher modulation order is under discussion in order to increase the amount of transmission data and efficiently use radio resources. Further, provisioning of MBMS and application of 256QAM to data becomes an issue for a small cell.

An object of the present invention is to provide methods for solving the problem.

Another object of the present invention is to provide a method for transmitting Multimedia Broadcast and Multicast Service (MBMS) control information and data by applying 256QAM to MBMS.

Another object of the present invention is to define a new Cyclic Prefix (CP) for new MBMS data transmission and a reference signal for demodulation and to provide a method for transmitting MBMS data in MBMS, when a small cell is introduced.

Another object of the present invention is to provide apparatuses supporting these methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The present invention relates to a wireless access system supporting 256-ary Quadrature Amplitude Modulation (256QAM), and more particularly, to methods and apparatuses for transmitting and receiving a Physical Multicast Channel (PMCH) to provide Multimedia Broadcast and Multicast Service (MBMS).

In an aspect of the present invention, a method for receiving a PMCH by a User Equipment (UE) in a wireless access system supporting 256QAM includes receiving a System Information Block (SIB) including information for acquiring a Multicast Control Channel (MCCH), receiving a PMCH carrying an MCCH including Multimedia Broadcast and Multicast Service (MBMS) control information, and receiving a PMCH carrying a Multicast Traffic Channel (MTCH) including MBMS data based on the MBMS control information. 256QAM is not applied to the PMCH carrying the MCCH, and the UE derives a Modulation and Coding Scheme (MCS) and a Transport Block Size (TB S) using a second table supporting 256QAM to receive and demodulate the PMCH carrying the MTCH.

In another aspect of the present invention, a UE for receiving a PMCH in a wireless access system supporting 256QAM includes a receiver, and a processor operatively connected to the receiver and configured to receive the PMCH supporting 256QAM.

The processor is configured to receive an SIB including information for acquiring an MCCH by controlling the receiver, to receive a PMCH carrying an MCCH including MBMS control information by controlling the receiver, and to receive a PMCH carrying an MTCH including MBMS data based on the MBMS control information by controlling the receiver. 256QAM is not applied to the PMCH carrying the MCCH, and the processor is configured to derive an MCS and a TBS using a second table supporting 256QAM to receive and demodulate the PMCH carrying the MTCH.

According to the above aspects, whether 256QAM is supported or not may be configured on a subframe basis.

The UE may receive the PMCH carrying the MTCH on the assumption that a PMCH Energy Per Resource Element (EPRE) is equal to a Multimedia Broadcast multicast service Single Frequency Network (MBSFN) Reference Signal (RS) EPRE.

The MBMS control information may be included in an MBSFN area configuration message and the MBSFN area configuration message may be transmitted on the MCCH.

The SIB may indicate whether 256QAM is supported on an MBSFN area basis.

The processor of the UE may derive an MCS and a TBS using a first table configured to support a legacy modulation scheme to receive and demodulate the PMCH carrying the MCCH.

It is to be understood that both the foregoing general description and the following detailed description of the present invention are exemplary and explanatory and are intended to provide further explanation of the invention as claimed.

Advantageous Effects

The embodiments of the present invention have the following effects.

First, since Downlink (DL) data is transmitted and received using a high-order modulation scheme, the data can be transmitted and received efficiently.

Second, since a method for applying 256QAM as a modulation scheme during MBMS is provided, the throughput of MBMS data can be increased, while MBMS control information is transmitted robustly.

Third, when MBMS is provided in a small cell environment, the MBMS can be provided more efficiently by defining a new CP length and defining a reference signal in relation to the new CP length.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 12 illustrates the architecture of a user plane and a control plane, for supporting Multimedia Broadcast and Multicast Service (MBMS).

BEST MODE

Figure 1:
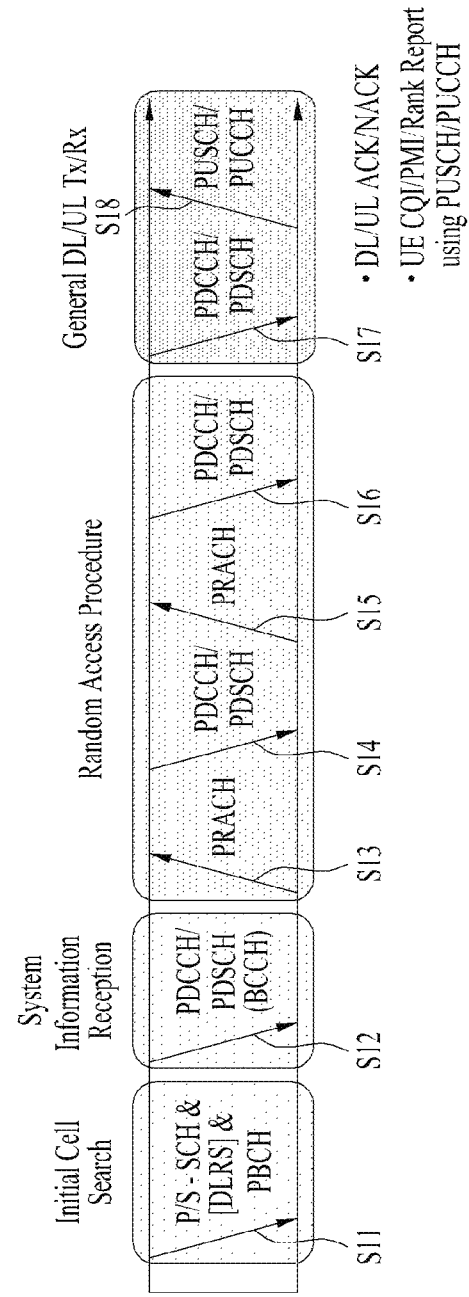
FIG. 1 is a conceptual diagram illustrating physical channels used in the embodiments and a signal transmission method using the physical channels.

Embodiments of the present invention relate to a wireless access system supporting 256-ary Quadrature Amplitude Modulation (256QAM) and more particularly, provide methods and apparatuses for transmitting and receiving a Physical Multicast Channel (PMCH) to provide Multimedia Broadcast and Multicast Service (MBMS).

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
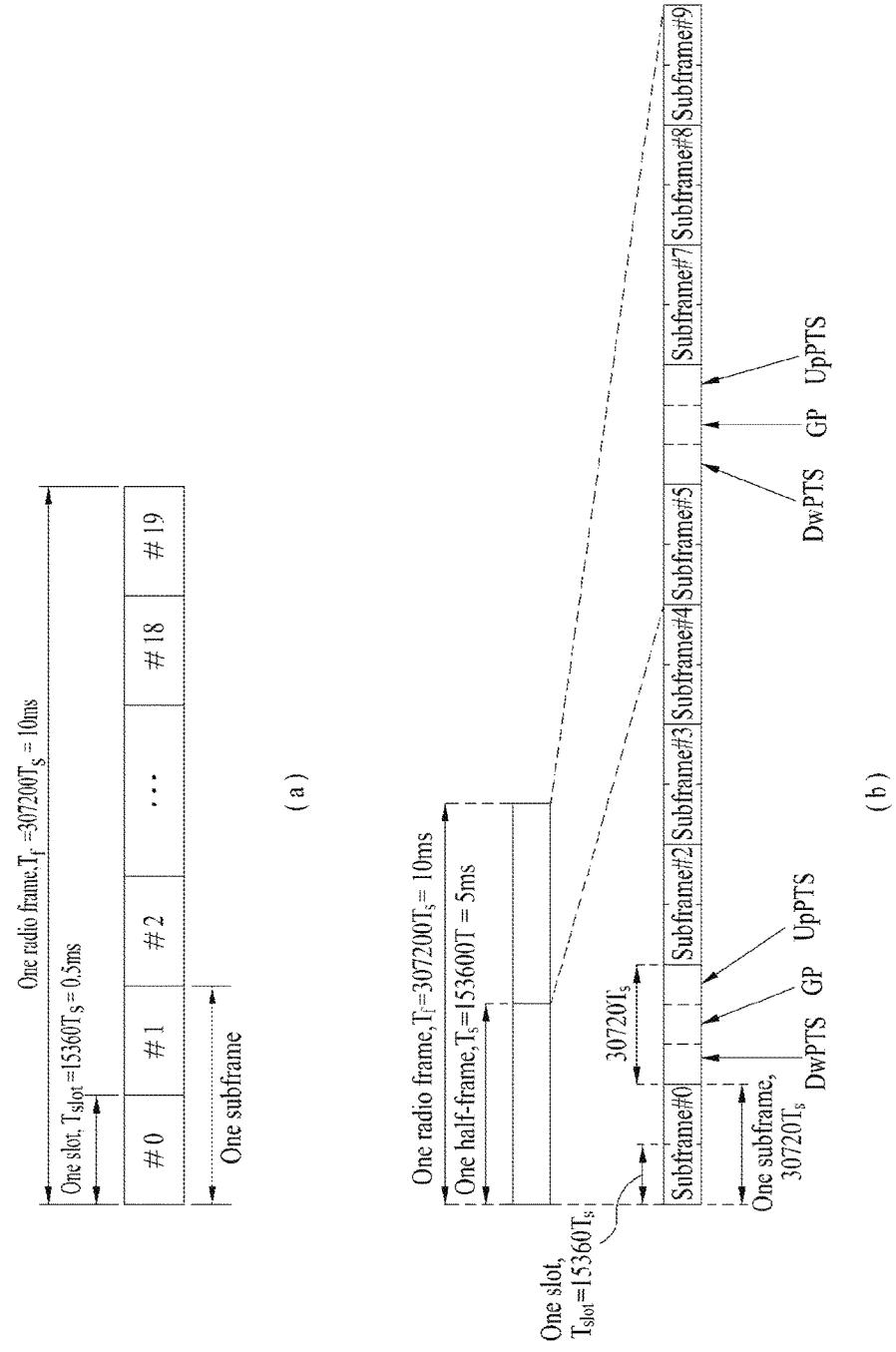
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms(=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 4:
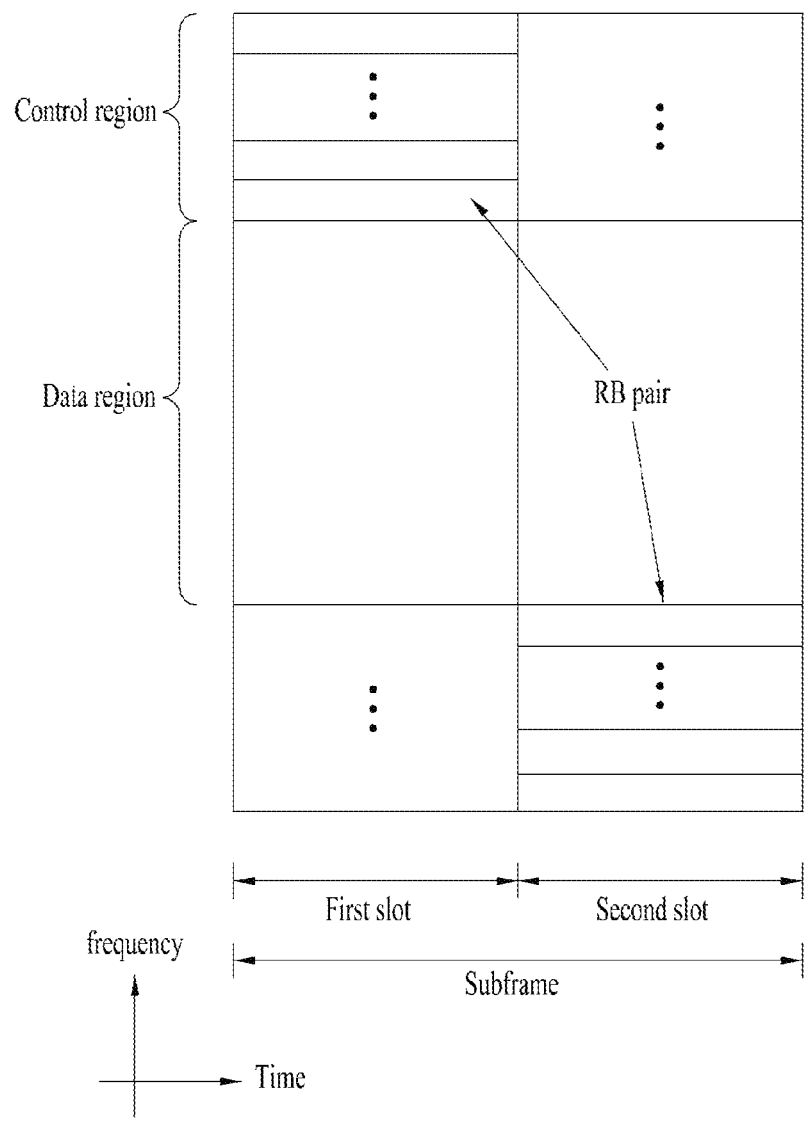
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
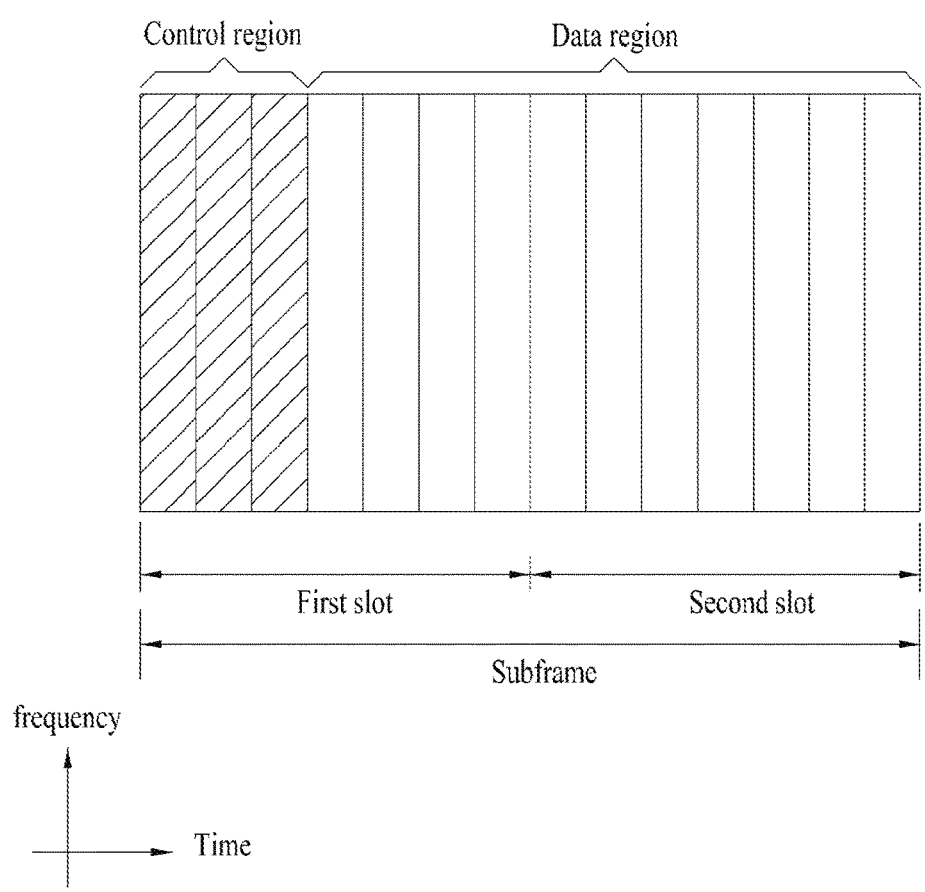
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
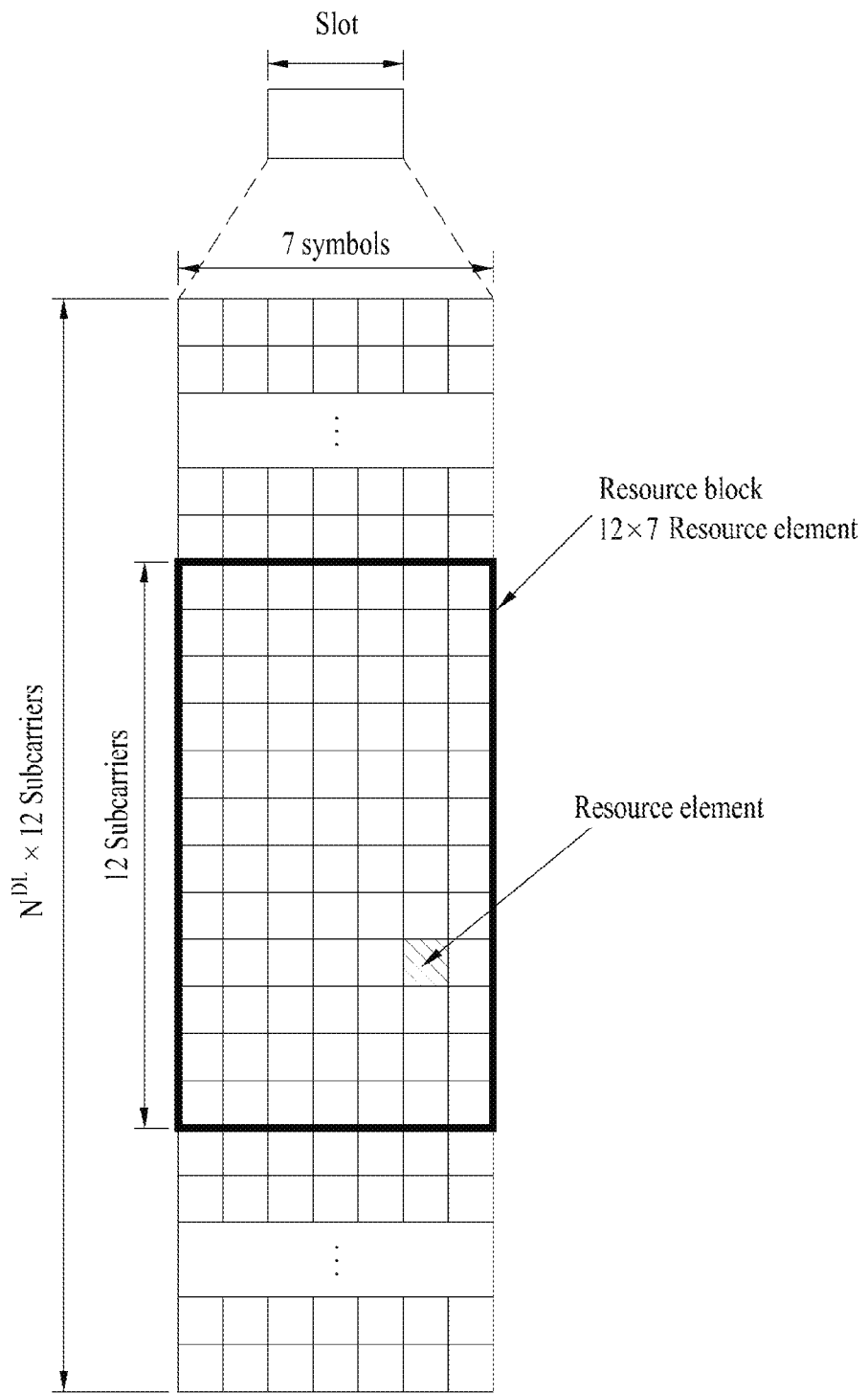
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which does not based on a codebook (Rel-8);

(8) Transmission mode 8: Precoding supporting up to two layers, which do not based on a codebook (Rel-9);

(9) Transmission mode 9: Precoding supporting up to eight layers, which do not based on a codebook (Rel-10); and

(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}$-1. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[[Table 4] illustrates the sizes of CSSs and USSs.

TABLE 4

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \mod \lfloor N_{CCE,k}/L \rfloor\}+i \qquad \text{Equation 1}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_x$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \mod D \qquad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system. There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources. For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells. Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
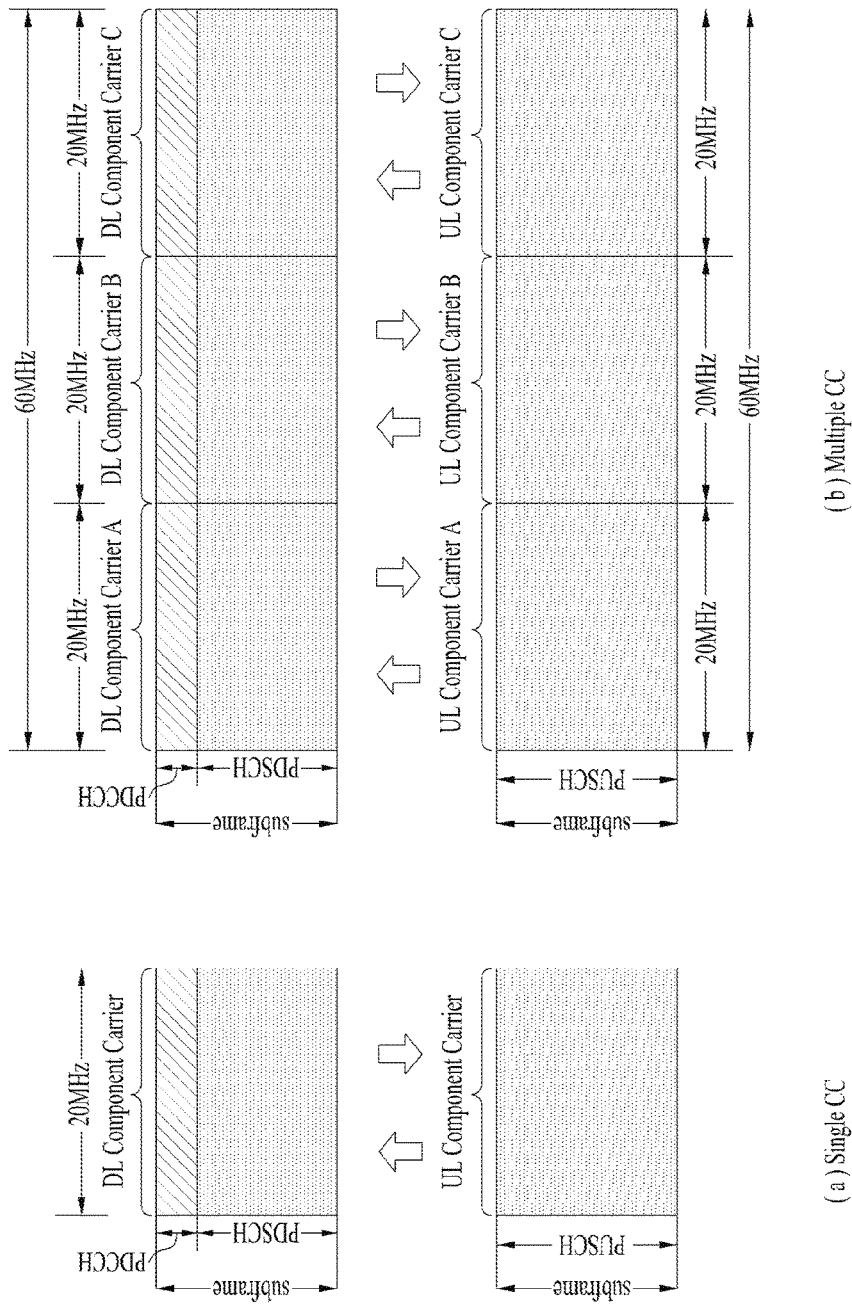
FIG. 6 is a diagram illustrating an example of a Component Carrier (CC) of the embodiments and Carrier Aggregation (CA) used in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

Figure 7:
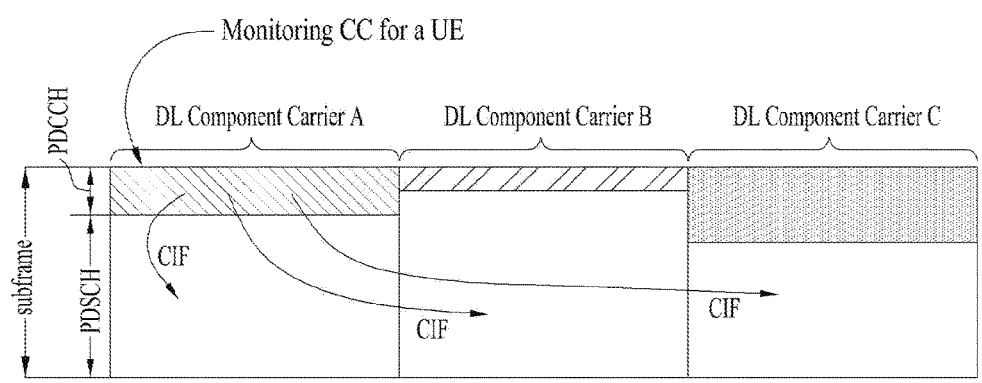
FIG. 7 illustrates a subframe structure of an LTE-A system according to cross-carrier scheduling.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE. FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
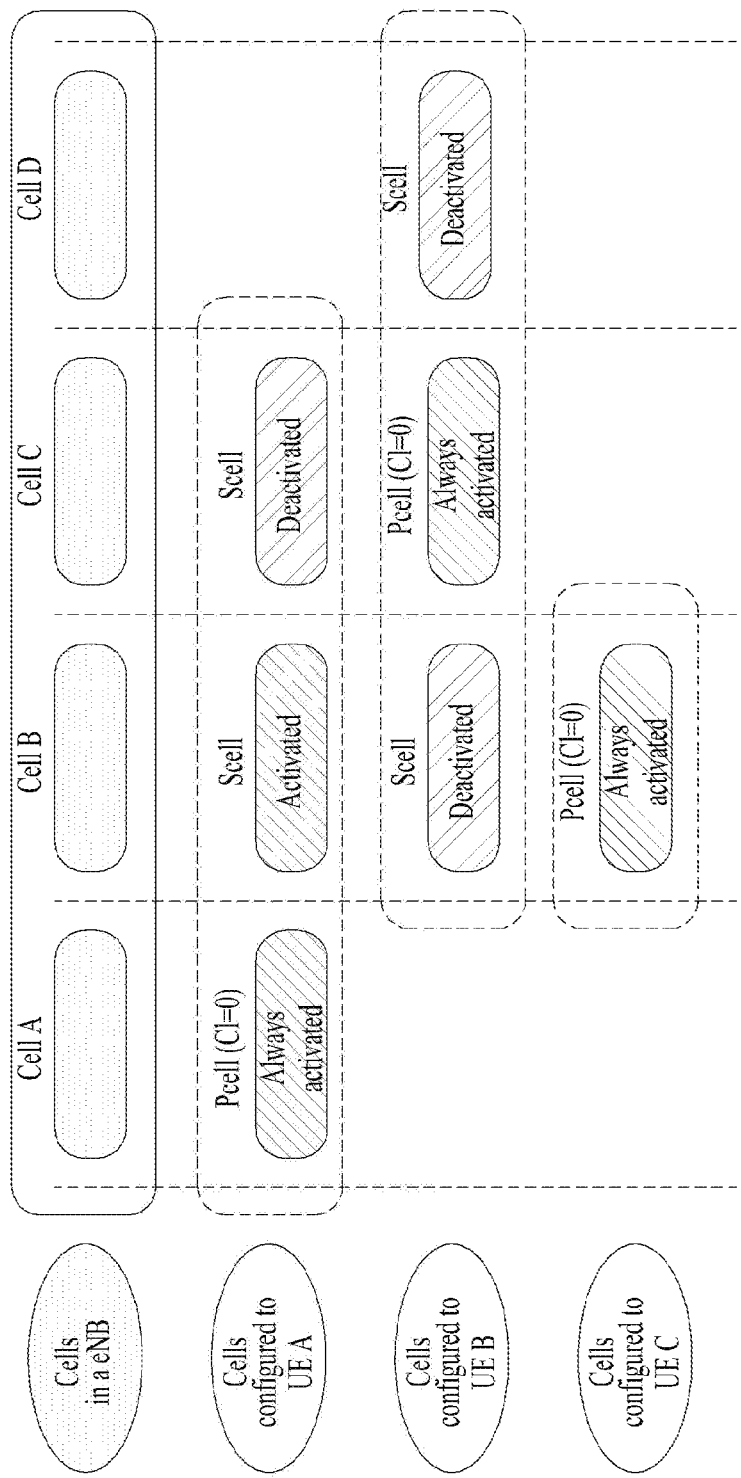
FIG. 8 is conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3. Method for Transmitting MCS Information 3.1 Channel Encoding

A wireless access system performs coding of transmission information of a transmission end (or transmitter) using a forward error correction code, and transmits the coded information, so that channel errors can be corrected by a reception end (or receiver).

The reception end demodulates a received (Rx) signal, performs decoding of forward error correction code, and recovers transmission information. By the decoding process, errors of the Rx signal caused by a radio frequency (RF) channel can be corrected. Although various kinds of error correction codes can be applied to the embodiments, the embodiments will hereinafter be described using a turbo code as an example.

Figure 9:
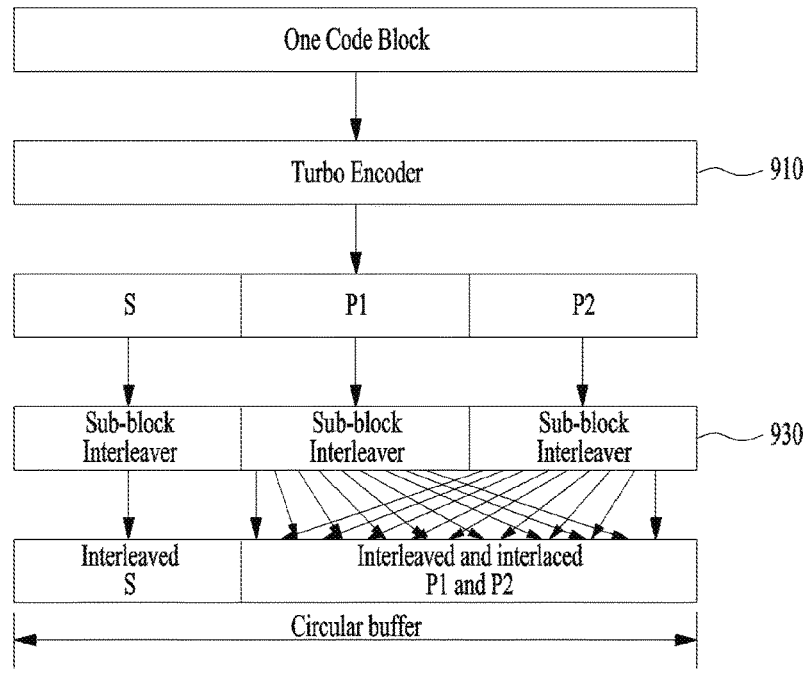
FIG. 9 is a conceptual diagram illustrating an example of rate matching using a turbo coder for use in the embodiments.
Figure 10:
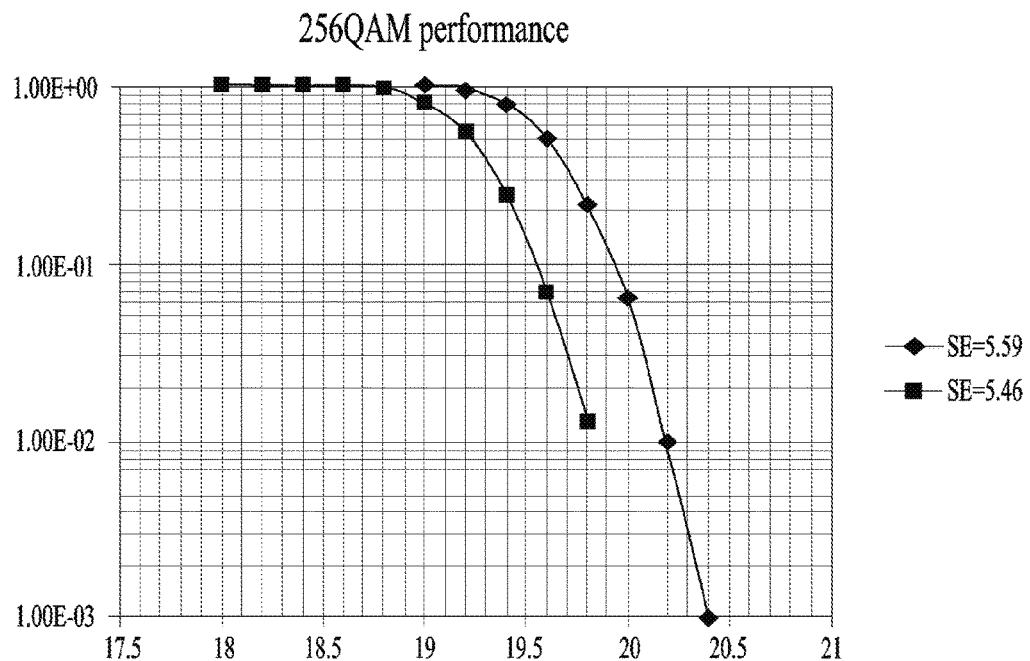
FIG. 10 is a graph illustrating 256-ary Quadrature Amplitude Modulation Additive White Gaussian Noise (256QAM AWGN) performance at a spectral efficiency of around 5.5547.

FIG. 9 is a conceptual diagram illustrating an example of rate matching using a turbo coder for use in the embodiments.

Referring to FIG. 9, the turbo coder may include a recursive systematic convolution code and an interleaver. An interleaver for facilitating parallel decoding may be used when the turbo code is actually implemented. One kind of such interleaver may be Quadratic Polynomial Permutation (QPP). The QPP interleaver may indicate a performance suitable for a specific size of a transport block (i.e., a data block), and the turbo-code performance increases in proportion to the TB size. Accordingly, to conveniently implement the turbo code by the wireless access system, the wireless access system divides a predetermined-sized TB into a plurality of small-sized TBs, and encodes the small-sized TBs. In this case, each small-sized TB is referred to as a code block.

Generally, although these code blocks have the same size, one of several code blocks may have another size due to the limitation of the QPP interleaver size. The transmitter performs the error correction coding process on the basis of a code block of the interleaver. For example, as can be seen from FIG. 9, one code block is input to the turbo coder 910. The turbo coder 910 performs 1/3 coding of an input code block, and outputs a systematic block and parity blocks (1, 2).

Thereafter, the transmitter performs interleaving of each block using the sub-block interleaver 930 so as to reduce influence of burst error encountered when data is transmitted through RF channels. The transmitter may map the interleaved code block to actual radio resources, and transmit the mapped result.

Since the amount of radio resources used for transmission is constant, the transmitter performs rate matching to the encoded code block so as to adjust the amount of radio resources to the amount of radio resources to be used for transmission. Generally, rate matching may be performed through puncturing or repetition of data.

Rate matching may be performed on the basis of an encoded code block unit as in WCDMA of 3GPP. In another method, the systematic block of the encoded code block and the parity blocks are separated from each other, such that independent interleaving may be performed for the separated systematic block and each parity block. As described above, FIG. 9 shows that the systematic block and the parity blocks are separated from each other so that rate matching is carried out.

A Cyclic Redundancy Code (CRC) for error detection is attached to a transport block (TB) transmitted from a higher layer of the transmitter, and CRC is attached to each code block separated from the TB. Various TB sizes need to be defined according to service categories of a higher layer. The transmitter may perform quantization to transmit TBs to the receiver. For TB quantization, a dummy bit is added in such a manner that a source TB transmitted from the higher layer can be adjusted for the size of TB of a physical layer. In this case, quantization may be preferably performed to minimize the amount of added dummy bits.

In accordance with the embodiments, the relationship among transport Block Size (TBS) modulation, MCS, and the number of allocated resources is a function. That is, the remaining one parameter is decided according to values of any two parameters. Accordingly, if the transmitter and/or the receiver perform signaling of the corresponding parameters, the transmitter and/or the receiver must inform the counterpart device of only two of three parameters.

For convenience of description and better understanding of the present invention, it is assumed that the transmitter uses parameters associated with MCS and the number of allocated resources so as to inform the receiver of a transport block size (TBS).

As exemplary factors capable of affecting the number of allocated resources, a pilot for performing channel estimation according to antenna construction, and resources used for transmission of RS (Reference Signal) and control information may be used. The above-mentioned factors may be changed every transmission moment.

3.2 MCS Index

In order to transmit TBS of DL data to the UE, the eNB may use DL control channels (e.g, PDCCH/EPDCCH). In this case, the eNB combines MCS index indicating MCS associated information with resource allocation information, and transmits TB size information of the TB transmitted on a PDSCH to the UE.

For example, the MCS index ($I_{MCS}$) field may be configured with 5 bits, and may be assigned radio resources from 1 RB to 110 RBs. Accordingly, in the case of a non-MIMO scheme to which MIMO is not applied, signaling of a TBS (permitting a duplicate size) corresponding to {32 (states)× 110 (RBs)} is possible. However, three states (e.g., 29, 30, 31) from among the MCS index field transmitted using 5 bits may be used to indicate modification of the modulation scheme during retransmission. Therefore, signaling of a TBS corresponding to (29×110) is actually possible.

In the current LTE/LTE-A system, there are three modulation schemes supporting DL data transmission, i.e., Quadrature Phase Shift Keying (QPSK), 16QAM (Quadrature Amplitude Modulation) and 64QAM. The MCS index may indicate a modulation order and a TBS index, and the MCS index may indicate the same TBS although a different modulation scheme is used at a switching point at which the modulation scheme is changed, such that the MCS index can efficiently operate in various channel environments. The amount of information capable of being transmitted during a unit time may be slightly changed at a switching point at which the modulation scheme is changed, as compared to SINR (Signal to Interference plus Noise Ratio) variation. Therefore, although the modulation scheme is changed at the switching point, the same TBS is indicated so that radio resources can be efficiently allocated.

Considering the above-mentioned matters, the MCS index field (e.g, $I_{MCS}$) transmitted through a DL control channel is mapped to another variable (i.e., $I_{TBS}$) so as to indicate the actual TB size. The following Table 6 shows a modulation order and a TBS index ($I_{TBS}$) table according to the 5-bit MCS index ($I_{MCS}$) for use in the current LTE/LTE-A system.

TABLE 6

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

[Table 7] below lists modulation orders and TBS indexes $I_{TBS}$ with respect to 5-bit MCS indexes $I_{MCS}$ which are newly defined to support 256QAM in the LTE/LTE-A system.

TABLE 7

| MCS Index $I_{MCS}$ | Modulation Order $Q_m$ | TBS Index $I_{TBS}$ |
| --- | --- | --- |
| 0 | 2 | 0 |
| 1 | 2 | 2 |

TABLE 7-continued

| MCS Index $I_{MCS}$ | Modulation Order $Q_m$ | TBS Index $I_{TBS}$ |
| --- | --- | --- |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

3.3. Method for Using a Plurality of MCS Tables

In embodiments of the present invention, [Table 6] will be referred to as a first table or a legacy table and [Table 7] will be referred to as a second table or a new table. That is, the first table is configured to support legacy modulation schemes (e.g., QPSK, 16QAM, and 64QAM) and the second table is configured to support the legacy modulation schemes and 256QAM.

Figure 11:
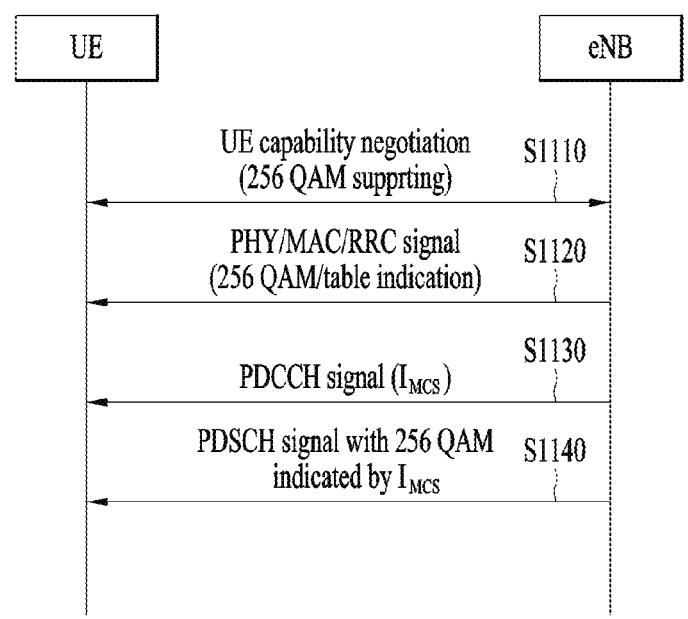
FIG. 11 is a flowchart illustrating one of methods for transmitting a Modulation and Coding Scheme (MCS) index supporting 256QAM according to the embodiments.

FIG. 11 illustrates one of methods for transmitting an MCS index to support 256QAM according to an embodiment of the present invention.

In FIG. 11, it is assumed that each of a UE and an eNB maintains the first and second tables. The first table is [Table 6], defining MCS indexes for legacy UEs. The second table is [Table 7], defining MCS indexes for UEs supporting 256QAM.

Referring to FIG. 11, after initial access, the UE performs a UE capability negotiation procedure with the eNB in order to negotiate whether to support 256QAM (S1110).

It is assumed that the UE and the eNB have confirmed that they support 256QAM and have exchanged various parameters and/or fields to support 256QAM in step S1110.

Subsequently, if the eNB needs to transmit DL data modulated in 256QAM, the eNB may transmit to the UE a physical layer signal (e.g., a PDCCH signal and/or an EPDCCH signal) or a higher layer signal (e.g., a MAC signal or an RRC signal) including a 256QAM indicator indicating use of 256QAM or a table ID indicating the second table (S1120).

Upon receipt of the 256QAM indicator indicating use of 256QAM or the ID of the second table in step S1120, the UE may determine that the DL data transmitted by the eNB has been modulated in 256QAM. Accordingly, the UE may use the second table.

Then, the eNB transmits a PDCCH and/or an EPDCCH including $I_{MCS}$ to the UE. Since the UE has prepared the second table for 256QAM, the UE may derive a TBS based on the received $I_{MCS}$ from the second table (S1130).

The eNB modulates DL data (e.g., a DL-SCH signal) according to a modulation order and the TBS indicated to the UE by $I_{MCS}$ and transmits the modulated DL data to the UE. The UE receives and demodulates the DL data based on $I_{MCS}$ received in step S1130 (S1140).

$I_{MCS}$ may be signaled in step S1130 according to the method described in Clause 4.1 or 4.2. For example, according to the method described in Clause 4.1, the MCS/TBS index table (i.e., the second table) supporting 256QAM is defined as a size of 5 bits. Accordingly, the PDCCH signal/EPDCCH signal including $I_{MCS}$ in step S1130 may be signaled in the same manner as in the LTE/LTE-A system.

4. Multimedia Broadcast and Multicast Service (MBMS)

4.1 MBMS Structure

MBMS supports both multicast/broadcast service and unicast service over a single network by supporting the multicast/broadcast service in a cellular system. In MBMS, the same content is transmitted to a plurality of users located in a specific area known as an MBMS service area including a plurality of cells. Each of cells participating in MBMS transmission configures point-to-multipoint radio resources and all users that have subscribed to MBMS receive the same transmission signal. There is no need for tracking the movement of users in a wireless access network and the users may receive content without any specific notification to the network.

FIG. 12 illustrates the architecture of a user plane and a control plane for supporting MBMS.

FIG. 12(a) illustrates the structure of a user plane for supporting MBMS. A Broadcast Multicast Service Center (BM-SC) located in a core network authenticates a content provider, performs billing, and establishes an overall data flow that passes through the core network. An MBMS gateway is a logical node for multicasting Internet Protocol (IP) packets received from the BM-SC to all eNBs participating in transmission within a Multimedia Broadcast multicast service Single Frequency Network (MBSFN) area.

An MBSFN area refers to a specific area in which one or more cells transmit the same content. One MBSFN area may cover a plurality of cells and one cell may belong to a plurality of (up to 8) MBSFN areas. From the perspective of MBSFN reception at a UE, individual cells are not distinguished from each other and an MBSFN area is statically determined.

FIG. 12(b) illustrates the structure of a control plane for supporting MBMS. For MBSFN transmission, time synchronization is required between cells within an MBSFN area and the cells preferably use the same radio resources for a specific service. A Multi-cell/Multicast Coordination Entity (MCE) performs such synchronization and coordinates radio resources. The MCE may control a plurality of eNBs within the MBSFN area. Also, the MCE may process session control signaling through an MME.

4.2. MBMS Operation

A UE is capable of MBMS reception in idle state (e.g., RRC_IDLE state) and/or connected state (e.g., RRC_CONNECTED state). To provide MBMS, the LTE/LTE-A system defines various DL channels.

For example, a Physical Multicast Channel (PMCH) is defined for use at the physical layer, a Multicast Channel (MCH) is defined as a transport channel, and a Multicast Control Channel (MCCH) and a Multicast Traffic Channel (MTCH) are defined as logical channels.

The MCCH is used to transmit control information for providing MBMS, and the MTCH is used to transmit data for providing MBMS. The MCCH and the MTCH may be mapped to the PMCH which is one of physical channels and then to be transmitted. As a UE receives an MCCH including scheduling information for an MTCH, the UE may receive and demodulate the MTCH.

To support MBMS, an idle-state UE may perform the following operation.

(1) A UE-specific DRX is configured and mobility is managed by a higher layer.

(2) The UE monitors a paging channel in order to detect an incoming call, a change of system information, an Earthquake and Tsunami Warning System (ETWS) notification if the UE is ETWS-enabled, and a Commercial Mobile Alert Service (CMAS) notification if the UE is CMAS-enabled.

(3) The UE may perform neighbor cell measurement and cell reselection.

(4) The UE may acquire system information.

(5) The UE may log possible measurements including locations and time.

To support MBMS, a connected-state UE may perform the following operation.

(1) The UE may transmit and receive unicast data.

(2) A UE-specific DRX may be configured for the UE at a lower layer.

(3) If the UE supports CA, the UE may use one or more SCells linked to a PCell in order to extend a bandwidth.

(4) The network may manage the mobility of the UE, for handover, a cell measurement command, etc.

(5) The UE monitors a paging channel and/or SIB1 in order to detect a change of system information, an ETWS notification if the UE is ETWS-enabled, and a CMAS notification if the UE is CMAS-enabled.

(6) The UE monitors a control channel to determine whether data has been scheduled on a shared data channel (7) The UE measures and feeds back channel quality, measures neighbor cells, and reports the neighbor cell measurements. In addition, the UE may acquire system information.

A logical channel for transmitting MBMS control information, MCCH has the following features.

(1) One MBSFN area is related to one MCCH and one MCCH corresponds to one MBSFN area. The MCCH is transmitted on a (P)MCH.

(2) An MCCH may include one MBSFN area configuration RRC message with a list of all MBMS services of connected sessions and optionally, an MBMSCountingRequest message.

(3) The MCCH is transmitted in all cells except for MBMS area-reserved cells within the MBSFN area.

(4) The MCCH may be transmitted in every MCCH repetition period by RRC signaling and may have a modification period.

(5) A notification mechanism may be used for the MCCH to notify a change in MCCH information due to session start or the presence of an MBMS counting request message.

4.2.1 MBMS Scheduling

MCCH information is transmitted periodically according to a configurable repetition period. Scheduling information is not provided for the MCCH. That is, a lower-layer configuration (e.g., a MAC-layer configuration) as well as time-domain scheduling is provided semi-statically as defined by an SIB13 message.

The E-UTRAN periodically provides MCH Scheduling Information (MSI) for MBMS user data transmitted on the logical channel, MTCH, through the lower layer (i.e., the MAC layer). The MCH information is related only to time-domain scheduling. That is, frequency-domain scheduling and a lower-layer configuration are provided semi-statically. The periodicity of the MSI is configurable and defined by an MCS scheduling period.

4.2.2 MCCH Information Validity and Change Notification

Figure 13:
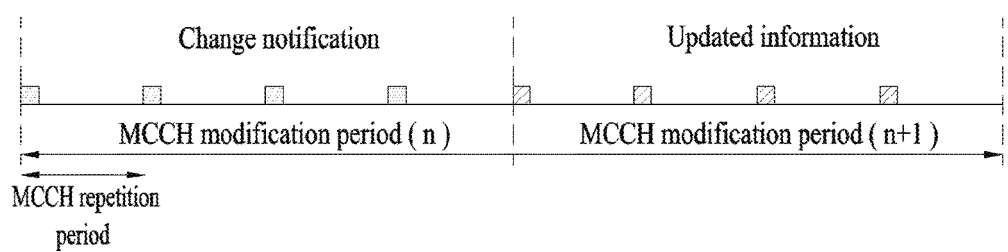
FIG. 13 illustrates a change notification mechanism for notifying a change of MCCG information.

FIG. 13 illustrates a change notification mechanism for notifying a change of MCCH information.

The change notification mechanism may be used to notify a change in MCCH information caused by the start of a session or the presence of an MBMSCountingRequest message. Referring to FIG. 13, when MCCH information has been changed, a process for notifying the change to a UE may be depicted. MCCH information is changed only in specific radio frames. The same MCCH information may be transmitted a plurality of times within a modification period.

The UE may monitor one or more notification subframes in every modification period. Upon receipt of a change notification, the UE may acquire an MCCH at the boundary of the next modification period. The UE may detect an MCCH change which has not been notified by the MCCH monitoring-based notification mechanism, during a modification period.

Modification period boundaries may be defined by SFNs satisfying SFN mod m=0. Herein, m is the number of radio frames included in a modification period. The modification period may be indicated by an SIB13 message.

Referring to FIG. 13, if the network is to change MCCH information, the network notifies UEs of the change in a first modification period. The network may transmit updated MCCH information in the next modification period (i.e., a second modification period). Upon receipt of the change notification, a UE interested in MBMS may immediately receive the new MCCH information in the next modification period.

To indicate a change in MCCH information to an idle-state or connected-state UE, an MBMS-specific RNTI (M-RNTI) may be used on a PDCCH. MCCH information change notifications on the PDCCH may be transmitted periodically only in MBSFN subframes. That is, a change notification is transmitted periodically in MBSFN subframes in every modification period before an MCCH modification. DCI format 1C including an M-RNTI is used for such a notification and includes an 8-bit bitmap to indicate one or more MBSFN areas to which an MCCH change has occurred.

4.2.3 MCCH Information Acquisition

Figure 14:
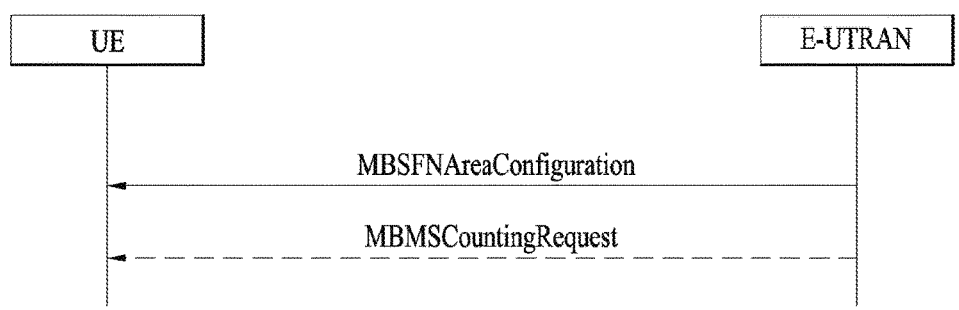
FIG. 14 is a diagram illustrating a signal flow for a procedure for acquiring Multicast Control Channel (MCCH) information by a User Equipment (UE).

FIG. 14 illustrates a procedure for acquiring MCCH information by a UE.

The UE may perform the MCCH information acquisition procedure illustrated in FIG. 14 in order to acquire MBMS control information broadcast by the E-UTRAN. For example, if a UE, which wants to receive MBMS, enters an MBSFN area or receives a notification indicating a change in MCCH information, the UE may start the MCCH information acquisition procedure. A UE that is receiving MBMS may also perform the MCCH information acquisition procedure.

That is, the E-UTRAN including one or more eNBs transmits an MBSFNAreaConfiguration message at the RRC layer to the UE in order to transmit MCCH information. As described before, the MBSFNAreaConfiguration message and/or the MBSFNCountingRequest message may be mapped to a logical channel MCCH, for transmission, and the MCCH may be mapped to a physical channel PMCCH, for transmission.

The MBSFNAreaConfiguration message includes MBMS control information applicable to an MBSFN area and the E-UTRAN configures an MCCH for each MBSFN area. That is, an MCCH identifies an MBSFN area.

The MBSFNAreaConfiguration message includes a pmchInfoList Information Element (IE) as MBMS control information. The pmchInfoList IE may include a dataMCS field to define MCS information for a subframe carrying a PMCH. The dataMCS field may indicate whether 256QAM is supported for the PMCH and may indicate $I_{MCS}$ indicating an MCS.

Upon receipt of the MBMSCountingRequest message, a UE may perform an MBMS counting procedure. The MBMS counting procedure is used to calculate the number of UEs that the E-UTRAN receives through an MRB or that want to receive a specific MBMS service through an MRB in RRC_CONNECTED state.

4.2.4 System Information Block (SIB) Message

In embodiments of the present invention, SIB messages related to MBMS are SIB13 and SIB15. SIB13 includes information needed to acquire MBMS control information related to one or more MBSFN areas, and SIB15 includes MBMS Service Area Identities (SAIs) for current and/or neighbor carrier frequencies. [Table 8] illustrates an exemplary configuration of an SIB13 message and [Table 11] illustrates an exemplary configuration of an SIB15 message.

TABLE 8

SystemInformationBlockType13-r9 ::= SEQUENCE {
  mbsfn-AreaInfoList-r9           MBSEN-AreaInfoList-r9,
  notificationConfig-r9             MBMS-NotificationConfig-r9,
  lateNonCriticalExtension        OCTET STRING
  OPTIONAL,      -- Need OP
  ...
}

[Table 9] illustrates an exemplary mbsfn-AreaInfoList IE format and [Table 10] illustrates fields included in the mbsfn-AreaInfoList IE format.

TABLE 9

| | |
|---|---|
| MBSFN-AreaInfoList-r9 ::= | SEQUENCE (SIZE(1..maxMBSFN-Area)) OF MBSFN-AreaInfo-r9 |
| MBSFN-AreaInfo-r9 ::= | SEQUENCE { |
|   mbsfn-AreaId-r9 | INTEGER (0..255), |
|   non-MBSFNregionLength | ENUMERATED {s1, s2}, |
|   notificationIndicator-r9 | INTEGER (0..7), |
|   mcch-Config-r9 | SEQUENCE { |
|     mcch-RepetitionPeriod-r9 | ENUMERATED {rf32, rf64, rf128, rf256}, |
|     mcch-Offset-r9 | INTEGER (0..10), |
|     mcch-ModificationPeriod-r9 | ENUMERATED {rf512, rf1024}, |

TABLE 9-continued

```
        sf-AllocInfo-r9              BIT STRING (SIZE(6)),
        signallingMCS-r9             ENUMERATED {n2, n7, n13, n19}
    },
    ...
}
    -- ASN1STOP
```

TABLE 10

MBSFN-AreaInfoList Fields mbsfn-AreaId
Indicates the MBSFN area ID, parameter $N_{ID}^{MBSFN}$ in TS 36.211 [21, 6.10.2.1]
mcch-ModificationPeriod
Defines periodically appearing boundaries, i.e. radio frames for which SFN mod mcch-
ModificationPeriod = 0. The contents of different transmissions of MCCH information can only be
different if there is at least one such boundary in-between them.
mcch-Offset
Indicates, together with the mcch-RepetitionPeriod, the radio frames in which MCCH is scheduled i.e.
MCCH is scheduled in radio frames for which: SEN mod mcch-RepetitionPeriod = mcch-Offset.
mcch-RepetitionPeriod
Defines the interval between transmissions of MCCH information, in radio frames, Value rf32
corresponds to 32 radio frames, rf64 corresponds to 64 radio frames and so on.
non-MBSFNregionLength
Indicates how many symbols from the beginning of the subframe constitute the non-MBSFN region.
This value applies in all subframes of the MBSFN area used for PMCH transmissions as indicated in the
MSI. The values s1 and s2 correspond with 1 and 2 symbols, respectively: see TS 36.211 [21, Table 6.7-
1].
notificationindicator
Indicates which PDCCH bit is used to notify the UE about change of the MCCH applicable for this
MBSFN area. Value 0 corresponds with the least significant bit as defined in TS 36.212 [22, Section
5.3.3.1] and so on.
sf-AllocInfo
Indicates the subframes of the radio frames indicated by the mcch-RepetitionPeriod and the mcch-Offset,
that may carry MCCH. Value "1" indicates that the corresponding subframe is allocated. The following
mapping applies:
FDD: The first/ leftmost bit defines the allocation for subframe #1 of the radio frame indicated by mcch-
RepetitionPeriod and mcch-Offset, the second bit for #2, the third bit for #3 , the fourth bit for #6, the fifth
bit for #7 and the sixth bit for #8.
TDD: The first/leftmost bit defines the allocation for subframe #3 of the radio frame indicated by mcch-
RepetitionPeriod and mcch-Offset, the second bit for #4, third bit for #7, fourth bit for #8, fifth bit for #9.
Uplink subframes are not allocated. The last bit is not used.
signallingMCS
Indicates the Modulation and Coding Scheme (MCS) applicable for the subframes indicated by the field
sf-AllodnInfo and for each (P)MCH that is configured for this MBSFN area, for the first subframe allocated
to the (P)MCH within each MCH scheduling period (which may contain the MCH scheduling information
provided by MAC). Value n2 corresponds with the value 2 for parameter $I_{MCS}$ in TS 36.213 [23, Table
7.1.7.1-1], and so on.

Referring to [Table 10], the MBSFN-AreaInfo IE includes a signaling MCS field. The signaling MCS field indicates an MCS applicable to a (P)MCH configured for an MBSFN area, subframes indicated by an sf-AllocInfo field, and/or a first subframe allocated to the (P)MCH within an MCS scheduling period. The MCS field may be set to n2, n7, n13, or n19. For example, if the signaling MCS field is set to 'n2', this means a value corresponding to $I_{MCS}$ index 2 in [Table 6] being the first table.

Further, the MBSFN-AreaInfo IE may include an mbsfn-Areaid field indicating an ID identifying the MBSFN area, an mcch-ModificationPeriod field for defining a boundary of an MCCH modification period, an mcch-Offset field indicating a radio frame in which an MCCH is scheduled, along with the mcc-ModificationPeriod field, an mcch-Repetition-Period field for defining a transmission interval for MCCH information, a non-MBSFNregionLength field indicating the number of symbols used to configure a non-MBSFN area, counted from the start of subframes, a notification-Indicator field indicating a PDCCH bit used to notify a change in an MCCH applicable to the MBSFN area, and an sf-AllocInfo field indicating a subframe including an MCCH.

TABLE 11

```
-- ASN1START
SystemInformationBlockType15-r11 ::=       SEQUENCE {
    mbms-SAI-IntraFreq-r11                 MBMS-SAI-List-r11          OPTIONAL,
    -- Need OR
    mbms-SAI-InterFregList-r11 MBMS-SAI-InterFregList-r11             OPTIONAL,      --
Need OR
```

TABLE 11-continued

```
lateNonCriticalExtension           OCTET STRING              OPTIONAL,
...,
 [[       mbms-SAI-InterFregList-v1140    MBMS-SAI-InterFregList-v1140
 OPTIONAL    -- Cond InterFreq
 ]]
}
MBMS-SAI-List-r11 ::=              SEQUENCE (SIZE (1..maxSAI-MBMS-r11)) OF
MBMS-SAI-r11
MBMS-SAI-r11 ::=                   INTEGER (0..65535)
MBMS-SAI-InterFregList-r11 ::=     SEQUENCE (SIZE (1..maxEreq)) OF MBMS-SAI-
InterFreq-r11
MBMS-SAI-InterFregList-v1140 ::=   SEQUENCE (SIZE (1..maxEreq)) OF MBMS-SAI-
InterFreq-v1140
MBMS-SAI-InterFreq-r11 ::=         SEQUENCE {
   dl-CarrierFreq-r11                    ARFCN-ValueEUTRA-r9,
   mbms-SAI-List-r11                     MBMS-SAI-List-r11
}
MBMS-SAI-InterFreq-v1140 ::=       SEQUENCE {
   multiBandInfoList-r11                 MultiBandInfoList-r11    OPTIONAL
   -- Need OR
}
-- ASN1STOP
```

Referring to [Table 11], the SIB15 message may include an mbms-SAI-interFreqList field including a list of the frequency bands of neighbor cells, an mbms-SAI-IntraFreq field including a list of MBMS SAIs for the frequency band of a current cell, an mbms-SAI-List field including a list of MBMS SAIs for a specific frequency band, and a multi-BandInfoList field including a list of frequency bands applicable to cells participating in MBSFN transmission. For a description of other parameters included in [Table 11], a technical specification TS 36.331 v12.2 may be referred to.

5. MBMS Transmission Method

Various methods for improving the MBMS transmission performance of the LTE/LTE-A system will be described below based on the descriptions of Clauses 1 to 4. Particularly, considering that the LTE-A system aims to introduce small cells and support 256QAM, MBMS transmission methods in the case of supporting small cells and 256QAM will be described.

5.1. Method for Using Normal CP

An extended CP is always used as a CP for a PMCH transmitted for MBMS in the legacy LTE/LTE-A system (e.g., Rel' 8/9/10/11/12). The long CP is adopted to combine signals transmitted with SFNs in a macro cell area.

However, as deployment of small cells has been actively discussed for a future-generation system, there exists a need for supporting MBMS for the reason that MBMS is helpful for improving Quality of Service (QoS) of a UE in a small cell area.

In general, since small cells are deployed densely with low transmission power, the coverage of a small cell is small relative to that of a macro cell. Accordingly, in the case of PMCH transmission in a small cell-based LTE network, it is more efficient to use a normal CP than an extended CP in view of a higher PMCH transmission rate.

If the normal CP is used for PMCH transmission, an MBSFN Reference Signal (RS) needs to be newly defined. The MBSFN RS may be designed based on the following principle.

(1) An RS is not transmitted in a symbol available for a PDCCH.

(2) RSs are arranged equidistantly in the frequency domain.

(3) RSs are arranged equidistantly in the time domain.

RSs used for data demodulation such as Cell-specific RS (CRS) or UE-specific RS (UE-RS) used in the legacy system are all arranged equidistantly in the frequency/time domain. That is, the same channel estimator structure may be used by designing the MBSFN RS based on the above principle.

Arrangement of MBSFN RSs for antenna port M in a PMCH subframe to which the normal CP is applied based on the above principle will be described.

Figure 15:
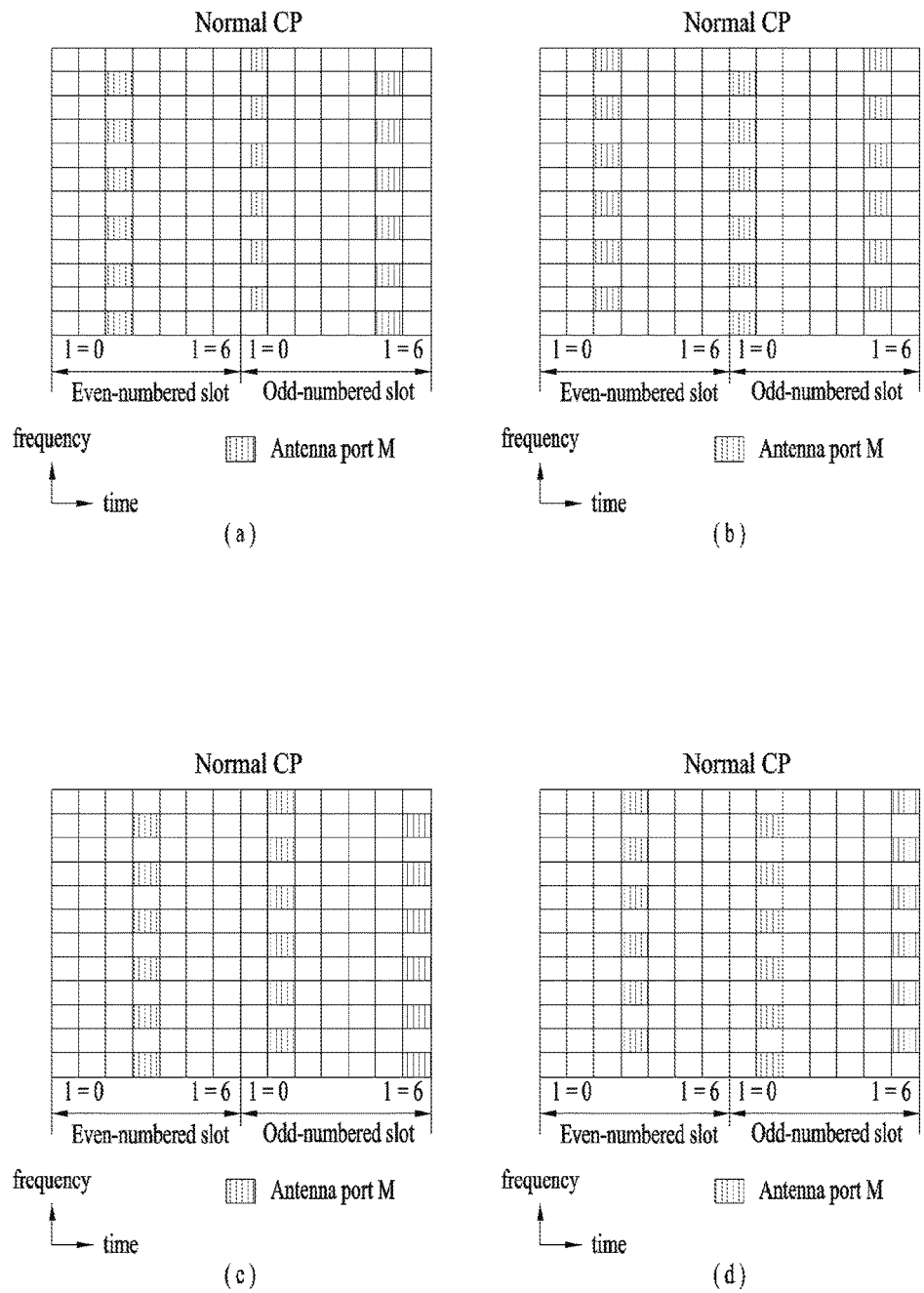
FIG. 15 illustrates a method for Multimedia Broadcast Single Frequency Network (MBSFN) Reference Signals (RSs) for antenna port M in a Physical Multicast Channel (PMCH) subframe to which a normal Cyclic Prefix (CP) is applied.

FIG. 15 illustrates a method for arranging MBSFN RSs for antenna port M in a PMCH subframe to which the normal CP is applied.

Referring to FIG. 15, it is assumed that a Resource Block (RB) included in one subframe includes 14 OFDM symbols and 12 subframes. An RS illustrated in FIG. 15 may be represented by a resource unit (1, k) where 1 is an OFDM symbol index and k is a subcarrier index.

In FIG. 15, RSs configured based on the above MBSFN RS configuration principle are arranged. FIGS. 15(a) and 15(b) illustrate a case in which a PDCCH can be allocated up to OFDM symbol index 1 and FIGS. 15(c) and 15(d) illustrate a case in which a PDCCH can be allocated up to OFDM symbol index 2. The same subframe spacing and the same OFDM symbol spacing may be set for MBSFN RSs. For example, MBSFN RSs may be arranged every 2 subframes and every 5 OFDM symbols.

Figure 16:
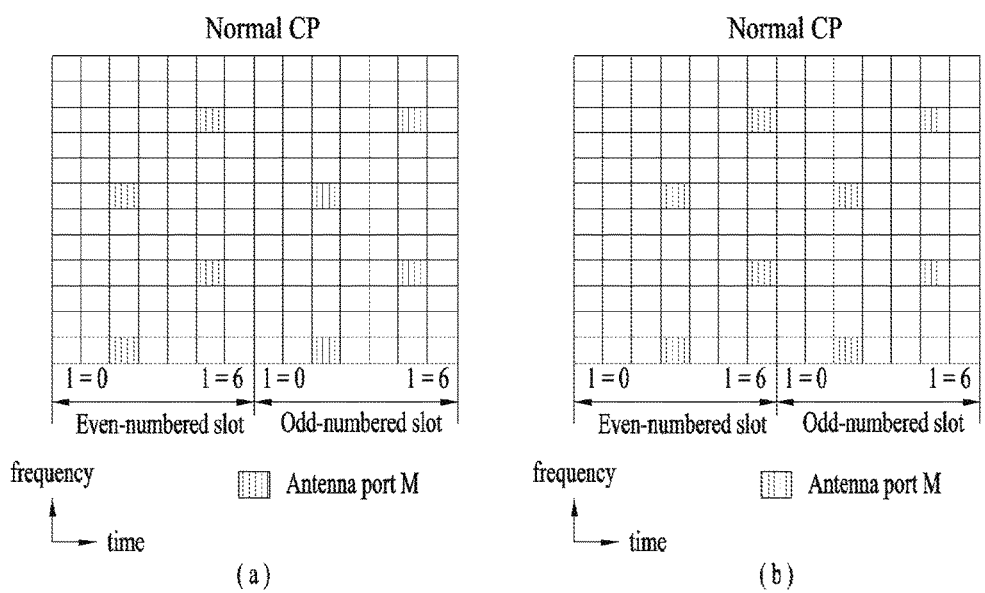
FIG. 16 illustrates another method for MBSFN RSs for antenna port M in a PMCH subframe to which a normal CP is applied.

FIG. 16 is another view illustrating a method for arranging MBSFN RSs for antenna port M in a PMCH subframe to which the normal CP is applied.

Support of an MBSFN normal CP means operability in an environment in which the delay spread of a radio channel is relatively small. Therefore, the frequency-domain spacing of MBSFN RSs may be set to be wider than in FIG. 15. As a consequence, more MBSFN data can be transmitted.

For example, MBSFN RSs may be arranged at a spacing of a factor of the number of subcarriers in one RB. If one RB includes 12 subcarriers, MBSFN RSs may be arranged in one symbol area at a subcarrier spacing of 2, 3, or 6 which is a factor of 12.

FIG. 16 illustrates a case in which MBSFN RSs are arranged at a spacing of 6 subframes in the normal CP MBSFN subframe, by way of example. FIG. 16(a) illustrates a case in which a PDCCH can be allocated up to OFDM symbol index 1 and FIG. 16(b) illustrates a case in which a PDCCH can be allocated up to OFDM symbol index 2. Herein, it is assumed that the OFDM symbol spacing is 3.

In another aspect of the embodiment, if a carrier dedicated to MBMS is introduced, a control channel such as a PDCCH may not be transmitted. Therefore, MBSFN RSs may also be defined in the first two OFDM symbols of each subframe carrying a PDCCH. In the exemplary layouts of MBSFN RSs illustrated in FIGS. 15 and 16, MBSFN RSs may be allocated by shifting −1 or −2 OFDM symbols in the time domain.

In another aspect of the embodiment, if the normal CP is supported for an MBSFN subframe, it is preferable for the eNB or the network (E-UTRAN) to indicate a CP length used for a PMCH to a UE, for PMCH demodulation.

In a first method, the eNB or the network may indicate a CP length by an SIB. For example, CP length information may be added to an MBSFNAreaInfoList-r9 IE included in the afore-described SIB13. In this method, a CP length is configured on an MBSFN area basis. In this case, a UE may assume that the extended CP is used, unless otherwise configured. Only when the normal CP is configured for a specific MBMS area by an SIB13 message, the UE may receive and decode a corresponding MBMS subframe by applying the normal CP.

If one or more MBMS areas share one or more MBSFN subframes and different types of CPs are used for different subframes, the UE may assume that the extended CP is used in a corresponding MBSFN area.

In a second method, the eNB or the network may add CP length information to an MBSFNSubframeConfig IE included in an MBSFNSubframeConfigList IE of SIB2. In this method, a CP length is configured on an MBSFN subframe basis. If the normal CP is supported for a specific MBSFN subframe, the eNB should indicate a CP length of a subframe carrying a PRS to the UE.

In general, if subframes carrying PRSs include both MBSFN subframes and general subframes, an MBSFN subframe configured as a PRS subframe adopts a CP of the same length as used for subframe #0. Further, if subframes carrying PRSs are all MBSFN subframes, the MBSFN subframes configured as PRS subframes use the extended CP.

However, in the case of supporting an MBSFN having the normal CP, even though PRS subframes are all MBSFN subframes, an MBSFN CP may be configured as the normal CP or the extended CP.

When the normal CP is used, the number of resources available for PRS transmission increases, thereby improving PRS-based location tracking performance. CP length information for an MBSFN subframe may be transmitted in the afore-described method for indicating a CP length for an MBSFN subframe. For example, if PRS subframes are all MBSFN subframes, the CP length of the PRS subframes may be configured to be equal to the CP length of an MBSFN subframe indicated to the UE by an SIB (e.g., SIB2 or SIB13).

5.2 Method for Providing MBMS Using 256QAM

Now a description will be given of embodiments of applying 256QAM to increase the transmission efficiency of a PMCH used to provide MBMS.

In one aspect of the present invention, there may be 256QAM-supporting UEs and non-256QAM-supporting UEs among UEs that receive PMCHs, for MBMS reception. Therefore, a PMCH that a 256QAM-supporting UE can receive may be transmitted distinguishably from a PMCH that a non-256QAM-supporting UE can receive.

The 256QAM-supporting UE should acquire information about the PMCH supporting 256QAM. Thus, the network (e.g., the eNB or the E-UTRAN) may indicate whether 256QAM is supported to the UE by an SIB, on an MBSFN area basis or on an MBSFN subframe basis.

In embodiments of the present invention, the UE may assume that 256QAM is not used unless otherwise configured by the eNB or the like. Therefore, only when 256QAM is configured for a specific MBSFN area, the UE may use 256QAM to decode and demodulate a PMCH.

In another aspect of the embodiments, in the case where one or more MBSFN areas share one or more MBSFN subframes, if a 256QAM-supporting subframe is coexistent with a non-256QAM-supporting subframe, the UE may assume that 256QAM is not used for the subframes. That is, only when 256QAM is configured for a specific MBSFN area, the UE may use 256QAM to decode and demodulate a PMCH.

In another aspect of the embodiments, the eNB or the like may indicate whether 256QAM is supported on an MBSFN subframe basis to the UE by an SIB.

In another aspect of the embodiments, in the case where the eNB supports 256QAM for PMCH transmission, if the eNB transmits a PMCH using 256QAM, the UE may be configured to assume that the ratio of MBSFN RS Energy Per RE (EPRE) to PMCH EPRE is 0 dB. This advantageously enables the UE to decode the PMCH in the same manner as when 16QAM/64QAM is used in the legacy system.

In the foregoing embodiments of the present invention, the eNB may transmit an MCCH carrying control information for providing MBMS and an MTCH carrying data for providing MBMS on PMCHs. Herein, the eNB may be configured to apply 256QAM only to the PMCH for MCCH transmission, not to the PMCH for MTCH transmission.

In the foregoing embodiments of the present invention, in the case where the eNB supports 256QAM for PMCH transmission, the UE may determine a TB size of a PMCH based on [Table 7] being a second table illustrating a mapping relationship between 256QAM-supporting MCS indexes and TBS indexes.

A detailed description will be given of the methods for providing MBMS with reference to FIG. 17.

Figure 17:
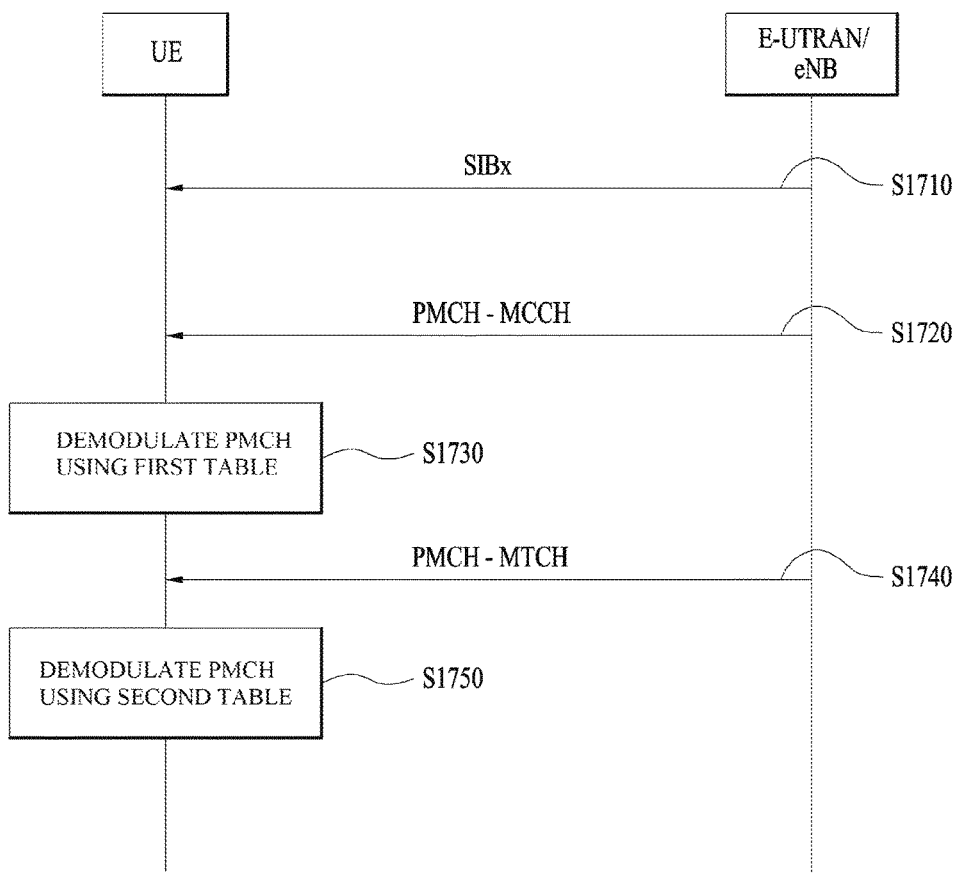
FIG. 17 is a diagram illustrating a signal flow for one of methods for providing MBMS.

FIG. 17 illustrates one of methods for providing MBMS.

The E-UTRAN may include one or more eNBs. The UE may be in RRC_IDLE or RRC_CONNECTED state and may want to receive or be receiving MBMS. It is assumed that the E-UTRAN is capable of transmitting system information or MBMS control information to the UE through the eNB. Further, it is assumed that the UE and the eNB preserve the first table (refer to [Table 6]) and the second table, for supporting 256QAM.

The eNB included in the E-UTRAN may transmit one or more SIBx messages to the UE in order to transmit MBMS-related system information (S1710).

For example, an SIB2 message includes an mbsfn-SubframeConfigList field that defines DL subframes reserved for MBSFN. An SIB13 message may include information for acquiring an MCCH carrying control information related to an MBSFN area, as described in [Table 8], [Table 9], and [Table 10]. An SIB15 message may include an MBSFN service area ID for a current and/or a neighbor carrier frequency band, as illustrated in [Table 11].

Further, the E-UTRAN including the eNB may transmit MBMS control information to the UE by a higher-layer signal. The higher-layer signal carrying the MBMS control information may be an MBSFNAreaConfiguration message described with reference to FIG. 14. The MBSFNAreaConfiguration message is transmitted on an MCCH and the MCCH may be mapped to a physical channel PMCH, for transmission. The UE may receive the MCCH on the PMCH based on the MCCH acquisition information including the MBSFN area-related control information, included in the SIB13 message (S1720).

Because the MCCH includes scheduling information for scheduling an MTCH, it is preferred not to apply 256QAM to the MCCH in step S1720. Therefore, the eNB may transmit a PMCH including an MCCH without applying 256QAM to the PMCH. In addition, an $I_{MCS}$ value indicating an MCS applied to a subframe carrying the MCCH may be included in the SIB13 message. Therefore, the UE may assume that 256QAM is not applied, when it demodulates the MCCH transmitted on the PMCH and may demodulate the MCCH using an MCS and a TBS based on an $I_{MCS}$ index defined in the first table (see [Table 6]) (S1730).

When the eNB transmits an MTCH on a PMCH, it may apply 256QAM. Since the MTCH is used to transmit MBMS data, the throughput of the network may be increased by applying 256QAM to the MTCH. The UE may acquire MTCH scheduling information (e.g., MBMS control information after demodulating the MCCH. That is, the UE may receive the MTCH based on the scheduling information (S1740).

The UE may receive and demodulate the PMCH including the MTCH based on the $I_{MCS}$ value included in the MBSFN area configuration information included in the MCCH demodulated in step S1730. That is, the UE may demodulate the PMCH using the MCS and TBS according to the $I_{MCS}$ index defined in the afore-described second table (refer to [Table 7]) (S1760).

In another aspect of FIG. 17, an MCCH and an MTCH transmitted on PMCHs may be configured on a subframe basis. That is, if support or non-support of 256QAM is determined on a subframe basis, non-support of 256QAM is indicated for a subframe carrying an MCCH, and support of 256QAM is indicated for a subframe carrying an MTCH. Therefore, the UE may receive MBMS control information robustly and the throughput of MBMS data in the system may be increased.

In another aspect of FIG. 17, the UE may receive a PMCH on the assumption that the PMCH EPRE and the MBSFN RS EPRE are equal (i.e., the ratio of PMCH EPRE to MBSFN RS EPRE=0 dB). MBSFN RSs are transmitted on the PMCH. When the UE and the PMCH support 256QAM, the UE may demodulate data accurately only when it is ware of the transmission power of a transmitted signal. Since the UE may decode the PMCH in the same manner as when 16QAM/64QAM is used for the PMCH in the legacy system, the UE may demodulate the PMCH based on 256QAM without introduction of an additional scheme.

6. Apparatus

Figure 18:
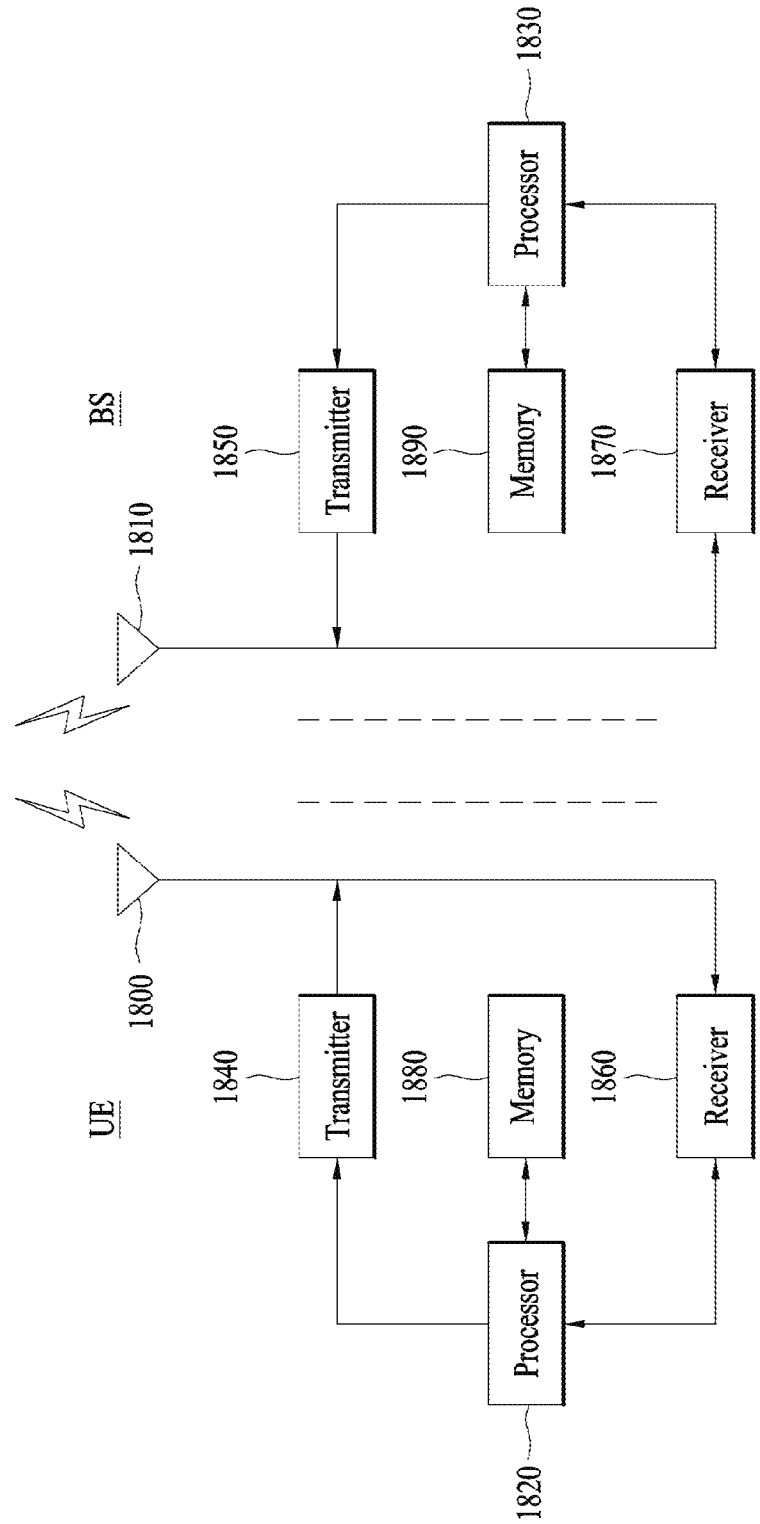
FIG. 18 is a block diagram of apparatuses for implementing the methods described in FIGS. 1 to 17.

Apparatuses illustrated in FIG. 18 are means that can implement the methods described before with reference to FIGS. 1 to 17.

A UE may act as a transmitting end on a UL and as a receiving end on a DL. An eNB may act as a receiving end on a UL and as a transmitting end on a DL. That is, each of the UE and the eNB may include a Transmitter 1840 or 1850 and a Receiver 1860 or 1870, for controlling transmission and reception of information, data, and/or messages, and an antenna 1800 or 1810 for transmitting and receiving information, data, and/or messages.

Each of the UE and the eNB may further include a processor 1820 or 1830 for implementing the afore-described embodiments of the present disclosure and a memory 1880 or 1190 for temporarily or permanently storing operations of the processor 1820 or 1830.

The embodiments of the present invention can be performed by suing components and functions of the UE and the eNB. For example, the processor of the eNB is able to maintain and manage the MCS/TBS index tables supporting the 256QAM, and the eNB is able to transmit $I_{MCS}$ for supporting 256QAM. In addition, the processor of the eNB can modulate and transmit the PMCH by applying the 256QAM. The processor of UE is able to receive and demodulate the PMCH modulated by the 256QAM by controlling the transmitter and the receiver. The specific examples is referred to the descriptions on Clause 5.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1880 or 1890 and executed by the processor 1820 or 1830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for receiving a Physical Multicast Channel (PMCH) by a User Equipment (UE) in a wireless access system supporting 256-ary Quadrature Amplitude Modulation (256QAM), the method comprising:
   receiving a first PMCH carrying a Multicast Control Channel (MCCH), the MCCH including Multimedia Broadcast and Multicast Service (MBMS) control information; and
   receiving a second PMCH carrying a Multicast Traffic Channel (MTCH), the MTCH including MBMS data based on the MBMS control information,
   deriving a first transport block size (TBS) used for the first PMCH carrying the MCCH using a first modulation and TBS index mapping table not supporting 256QAM;
   deriving a second TBS used for the second PMCH carrying the MTCH using a second modulation and TBS index mapping table supporting 256QAM.

2. The method according to claim 1, wherein whether 256QAM is supported or not is configured on a subframe basis.

3. The method according to claim 1, wherein the UE receives the second PMCH carrying the MTCH on the assumption that a PMCH Energy Per Resource Element (EPRE) is equal to a Multimedia Broadcast multicast service Single Frequency Network (MBSFN) Reference Signal (RS) EPRE.

4. The method according to claim 1, wherein the MBMS control information is included in an MBSFN area configuration message and the MBSFN area configuration message is transmitted on the MCCH.

5. The method according to claim 1, further comprising:
   receiving a System Information Block (SIB) including information for acquiring the MCCH,
   wherein the SIB indicates whether 256QAM is supported or not on an MBSFN area basis.

6. The method according to claim 1, further comprising:
   decoding the first PMCH carrying the MCCH based the first TBS; and
   decoding the second PMCH carrying the MTCH based on the second TBS.

7. A User Equipment (UE) for receiving a Physical Multicast Channel (PMCH) in a wireless access system supporting 256-ary Quadrature Amplitude Modulation (256QAM), the UE comprising:
   a receiver; and
   a processor operatively connected to the receiver,
   wherein the processor is configured to:
      control the receiver to receive first PMCH carrying a Multicast Control Channel (MCCH), the MCCH including Multimedia Broadcast and Multicast Service (MBMS) control information by controlling the receiver;
      control the receiver to receive a second PMCH carrying a Multicast Traffic Channel (MTCH), the MTCH including MBMS data based on the MBMS control information by controlling the receiver;
      derive a first transport block size (TBS) used for the first PMCH carrying the MCCH using a first modulation and TBS index mapping table not supporting 256QAM; and
      derive a second TBS used for the second PMCH carrying the MTCH using a second modulation and TBS index mapping table supporting 256QAM.

8. The UE according to claim 7, wherein whether 256QAM is supported or not is configured on a subframe basis.

9. The UE according to claim 7, wherein the processor is configured to control the receiver to receive the second PMCH carrying the MTCH on the assumption that a PMCH Energy Per Resource Element (EPRE) is equal to a Multimedia Broadcast multicast service Single Frequency Network (MBSFN) Reference Signal (RS) EPRE.

10. The UE according to claim 7, wherein the MBMS control information is included in an MBSFN area configuration message and the MBSFN area configuration message is transmitted on the MCCH.

11. The UE according to claim 7,
   wherein the processor is further configured to control the receiver to receive a System Information Block (SIB) including information for acquiring the MCCH, and
   wherein the SIB indicates whether 256QAM is supported or not on an MBSFN area basis.

12. The UE according to claim 7, wherein the processor is configured to:
   decode the first PMCH carrying the MCCH based the first TBS; and
   decode the second PMCH carrying the MTCH based on the second TBS.

* * * * *